United States Patent [19]
Ohmi et al.

[11] Patent Number: 5,988,217
[45] Date of Patent: Nov. 23, 1999

[54] SHUTOFF-OPENING DEVICE

[75] Inventors: Tadahiro Ohmi, Sendai; Keiji Hirao, Osaka; Shigeaki Tanaka, Osaka; Michio Yamaji, Osaka; Hiroshi Morokoshi, Osaka; Nobukazu Ikeda, Osaka, all of Japan

[73] Assignees: Tadahiro Ohmi, Sendai, Japan; Fujikin Incorporated, Osaka, Japan

[21] Appl. No.: 08/972,436

[22] Filed: Nov. 18, 1997

[30] Foreign Application Priority Data

Nov. 20, 1996 [JP] Japan .................................. 8-308865

[51] Int. Cl.$^6$ .................................................. F16K 31/12
[52] U.S. Cl. ..................... 137/614.2; 137/496; 137/613
[58] Field of Search .................... 137/613, 496, 137/614.2

[56] References Cited

U.S. PATENT DOCUMENTS

| | | | |
|---|---|---|---|
| 4,182,355 | 1/1980 | Briel et al. ............................. | 137/496 |
| 5,107,885 | 4/1992 | Nakazawa et al. ..................... | 137/496 |
| 5,139,225 | 8/1992 | Olson et al. . | |
| 5,161,571 | 11/1992 | Nakazawa ............................. | 137/496 |
| 5,762,086 | 6/1998 | Ollivier ................................. | 137/613 |

FOREIGN PATENT DOCUMENTS

| | | |
|---|---|---|
| 0 660 030 A2 | 12/1994 | European Pat. Off. . |
| 5-172265 | 5/1993 | Japan . |
| 5-172265 | 7/1993 | Japan . |

OTHER PUBLICATIONS

European Search Report, Apr. 17, 1998, Appln. No. 97120081.1.

*Primary Examiner*—A. Michael Chambers
*Assistant Examiner*—Thomas L. McShane
*Attorney, Agent, or Firm*—Armstrong, Westerman, Hattori, McLeland & Naughton

[57] ABSTRACT

A valve body has a main body formed with an inflow channel for a first fluid, an inflow channel for a second fluid, and an outflow channel for the first and second fluids in common. The first fluid inflow channel is always in communication with the common outflow channel through a valve chamber. A valve element operates to bring the second fluid inflow channel into or out of communication with the first fluid inflow channel and the common outflow channel.

6 Claims, 4 Drawing Sheets

SHUTOFF-OPENING DEVICE

BACKGROUND OF THE INVENTION

1. Field of the Invention

The present invention relates to shutoff-opening devices, for use in a fluid control apparatus included in semiconductor manufacturing equipment, and more particularly to shutoff-opening devices comprising a plurality of valves, to be provided at the fluid inlet and/or fluid outlet of a fluid controller such as a massflow controller and adapted to close or open a plurality of fluid channels.

2. Description of the Related Art

FIG. 4 shows a conventional shutoff-opening device 81 installed at the fluid inlet side of a massflow controller (see JP-A-172265/1993). The device 81 comprises a first on-off valve 82 remote from the inlet (at left in the drawing), and a second on-off valve 83 close to the inlet (at right in the drawing). The first on-off valve 82 comprises a first valve main body 84 and a first valve actuator 86. The second on-off valve 83 comprises a second valve main body 85 integral with the first valve main body 84, and a second valve actuator 87. The first valve main body 84 has a first fluid inflow channel 88, and a first fluid outflow channel 90 communicating with the inflow channel 88 via a valve chamber 89. The communication between the channels 90 and 88 is shut off or established by operating the first valve actuator 86. The second valve main body 85 has a main outflow channel 91 always communicating with the outflow channel 90 of the first valve main body 84 for discharging a first fluid toward the inlet of the massflow controller, a second fluid inflow channel 93 having one end opening at the bottom side of the second valve main body 85 and the other end communicating with a valve chamber 92, and a second fluid secondary outflow channel 94 having one end communicating with the second fluid inflow channel 93 via the valve chamber 92 and the other end always communicating with the main outflow channel 91. The communication between the channels 94 and 93 is shut off or established by operating the second valve actuator 87. Indicated at 95, 96 in FIG. 4 are diaphragms which are movable upward or downward within the respective valve chambers 89, 92 with the upward or downward movement of respective valve stems 97, 98 by the operation of the valve actuators 856, 87, whereby the respective inflow channels 88, 93 are shut off or opened.

With shutoff-opening devices of the type described, it is usual practice to pass a first fluid (e.g., process gas) through the device, thereafter pass a second fluid (e.g., purge gas) with the flow of first fluid interrupted, thereby discharging the first fluid from the device and replacing the first fluid by the second fluid, and Subsequently pass the first fluid again. The first fluid and the second fluid are alternatively passed through the conventional shutoff-opening device 81 in the following manner.

First, the first valve actuator 86 and the second valve actuator 87 are operated to open the first on-off valve 82 and close the second on-off valve 83, whereby the first fluid is caused to flow into the inlet of the massflow controller via the inflow channel 88 and the outflow channel 90 of the first valve body 84 and through the main outflow channel 91 of the second valve main body 85. At this time, the second fluid secondary outflow channel 94 is filled with the first fluid. The actuators 86, 87 are then operated to close the first on-off valve 82 and open the second on-off valve 83, whereby the second fluid is introduced into the inlet of the massflow controller via the second fluid inflow channel 93, the second fluid secondary outflow channel 94 and the main outflow channel 91. At this time, the second fluid flows while driving out by the pressure thereof the first fluid remaining in the secondary outflow channel 94 and the subsequent main outflow channel 91, and the first fluid outflow channel 90 of the first valve main body 84 is to be filled with the second fluid.

In the case where the first fluid and the second fluid are alternatively passed through the shutoff-opening device upon a change-over, it is very important to replace one fluid by the other fluid quickly to assure the fluid to be passed of its purity.

The conventional shutoff-opening device 81 has the following problem. When the second fluid is introduced into the second on-off valve 83 of the conventional device 81 through the second fluid inflow channel 93 after the passage of the first fluid, the first fluid remaining in the first fluid outflow channel 90 of the first valve main body 84 becomes mixed in small portions with the second fluid, presenting difficulty in replacing the first fluid by the second.

SUMMARY OF THE INVENTION

An object of the present invention is to provide a shutoff-opening device which permits quick replacement of one fluid by another fluid to assure the fluid to be passed of its purity.

The present invention provides a shutoff-opening device comprising a plurality of valves and to be installed at a fluid inlet and/or a fluid outlet of a massflow controller or like fluid controller for closing or opening a plurality of fluid channels, the shutoff-opening device being characterized in that a valve main body of at least one of the valves has a first inflow channel, a first outflow channel and a second inflow or outflow channel, the first inflow channel being always in communication with the first outflow channel through a valve chamber, a valve element being operable to bring the second inflow or outflow channel into or out of communication with the first inflow channel and the first outflow channel through the valve chamber.

In the case where the shutoff-opening device is installed at the fluid inlet side of a fluid controller, the second inflow or outflow channel serves as an inflow channel for a second fluid (such as a process gas in a semiconductor manufacturing apparatus), the first inflow channel serves as an inflow channel for a first fluid (such as a purge gas for use in the apparatus), and the first outflow channel serves as an outflow channel for the first and second fluids in common.

This arrangement will be described with reference to FIG. 3 wherein a shutoff-opening device 1 of the invention is provided at the fluid inlet side of the fluid controller and includes a valve 7 having a first inflow channel 61, a second outflow channel 64 and a second inflow or outflow channel 63. For example, an actuator 38 is first operated to bring the second fluid inflow channel (second inflow or outflow channel) 63 into communication with the first fluid inflow channel (first inflow channel) 61 and the common outflow channel (first outflow channel) 64, causing the second fluid to flow from the inflow channel 63 into the outflow channel 64. The actuator 38 is thereafter operated to shut of f the inflow channel 63 and pass the first fluid through the inflow channel 61 and the common outflow channel 54. At this time, the first fluid drives out the second fluid remaining in the outflow channel 64 by virtue of its own pressure, whereby the state in which the second fluid is mixed with the first fluid is obviated rapidly, permitting the first fluid only to flow through the device in a short period of time.

In the case were the shutoff-opening device is installed at the fluid outlet side of the fluid controller, the second inflow or outflow channel serves as an outflow channel for the second fluid, the first outflow channel serves as an outflow channel for the first fluid, and the first inflow channel serves as an inflow channel for the first and second fluids in common. This arrangement serves the same function as above to produce the same effect, since the inflow-outflow relation in this case is merely reverse to that of the above case.

Preferably, the shutoff-opening device further comprises a check valve having an upstream valve main body, a central valve main body, a downstream valve main body and a check mechanism.

Preferably, the check mechanism of the check valve comprises a tubular stationary seal member disposed in a rightward recess formed in the central valve main body, a tubular movable seal member disposed downstream from the stationary seal member and opposed thereto, and a diaphragm held between the central valve main body and the downstream valve main body for moving the movable seal member forward and rearward. When the fluid (purge gas in the embodiment to be described below) flows into the inflow channel the check valve, the pressure of the fluid deforms the diaphragm forward, consequently moving the movable seal member out of contact with the stationary seal member. The fluid flows by virtue of its own pressure from inside the recess into the outflow channel of the check valve through the interior of the movable seal member. On the other hand, when the fluid is about to flow reversely from the outflow channel into the recess with the introduction of fluid into the inflow channel discontinued, the diaphragm is deformed rearward, consequently bringing the movable seal member into contact with the stationary seal member and blocking the reverse flow of the fluid from the outflow channel into the recess.

DESCRIPTION OF THE PREFERRED EMBODIMENT

An embodiment of the invention will be described with reference to the drawings.

Figure 1:
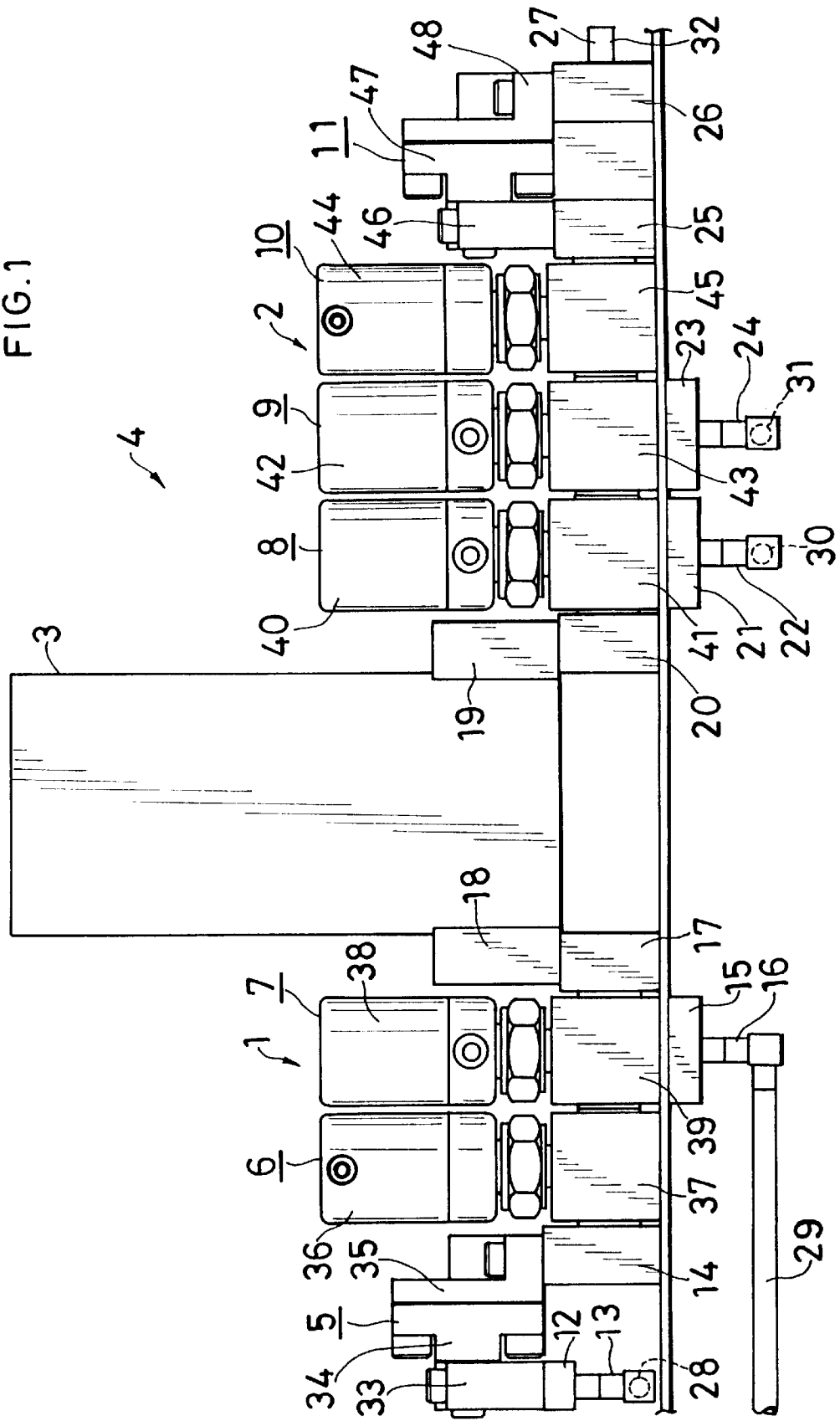
FIG. 1 is a front view showing a fluid control apparatus having incorporated therein shutoff-opening devices embodying the invention.

The terms front, rear, upper, lower, right and left are herein used based on FIG. 1; the right-hand side, the left-hand side, the upper side and the lower side of the drawing are referred to as front, rear, upper and lower, respectively, and the terms right and left are used for the device as it is viewed from the rear forward. These terms are used for the sake of convenience, and the device may be used with the front-rear relationship as reversed, or the upper and lower sides thereof positioned as the left and right sides.

Figure 2:
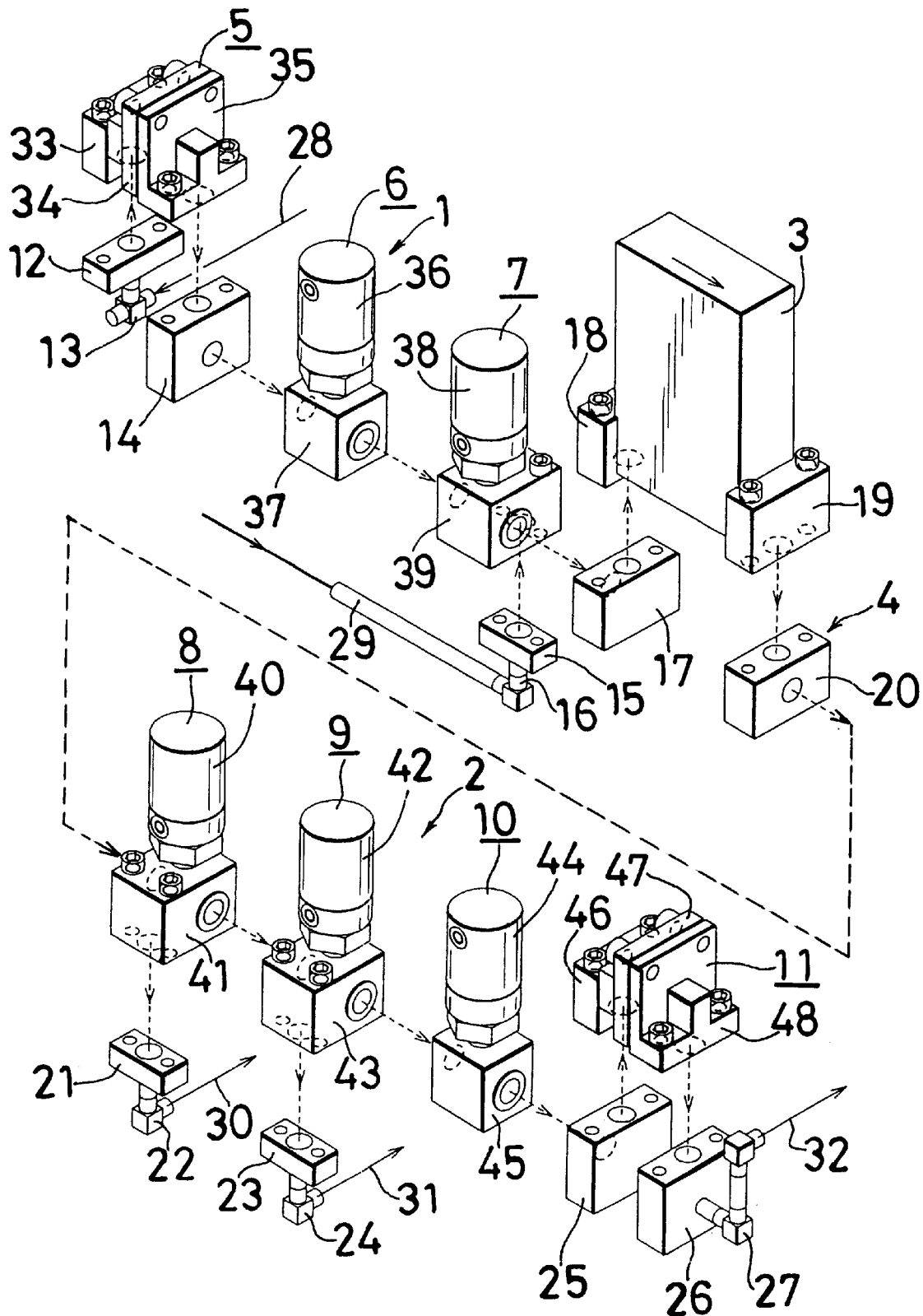
FIG. 2 is an exploded perspective view of the same.
Figure 3:
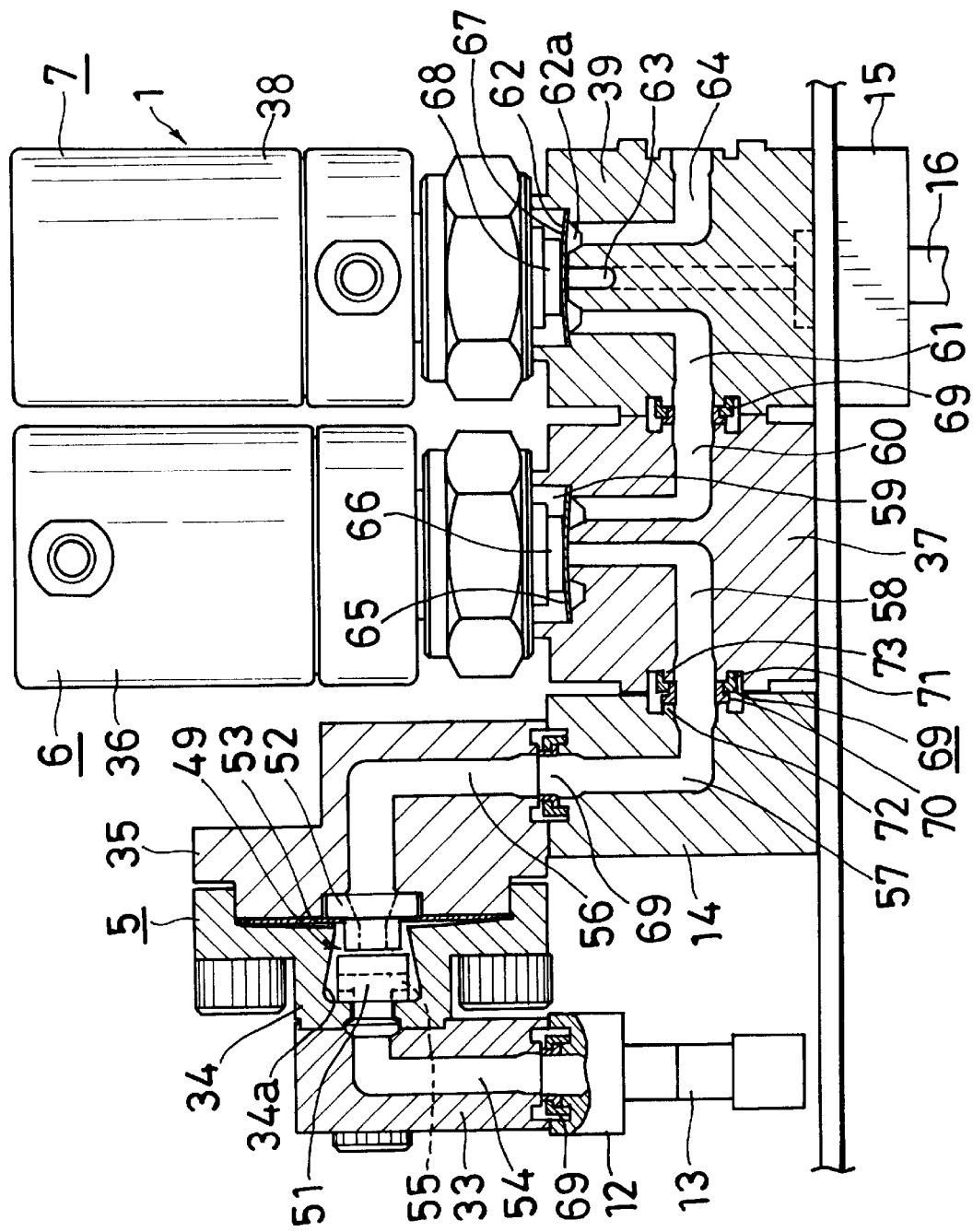
FIG. 3 is a view in vertical section of one of the shutoff-opening devices.
Figure 4:
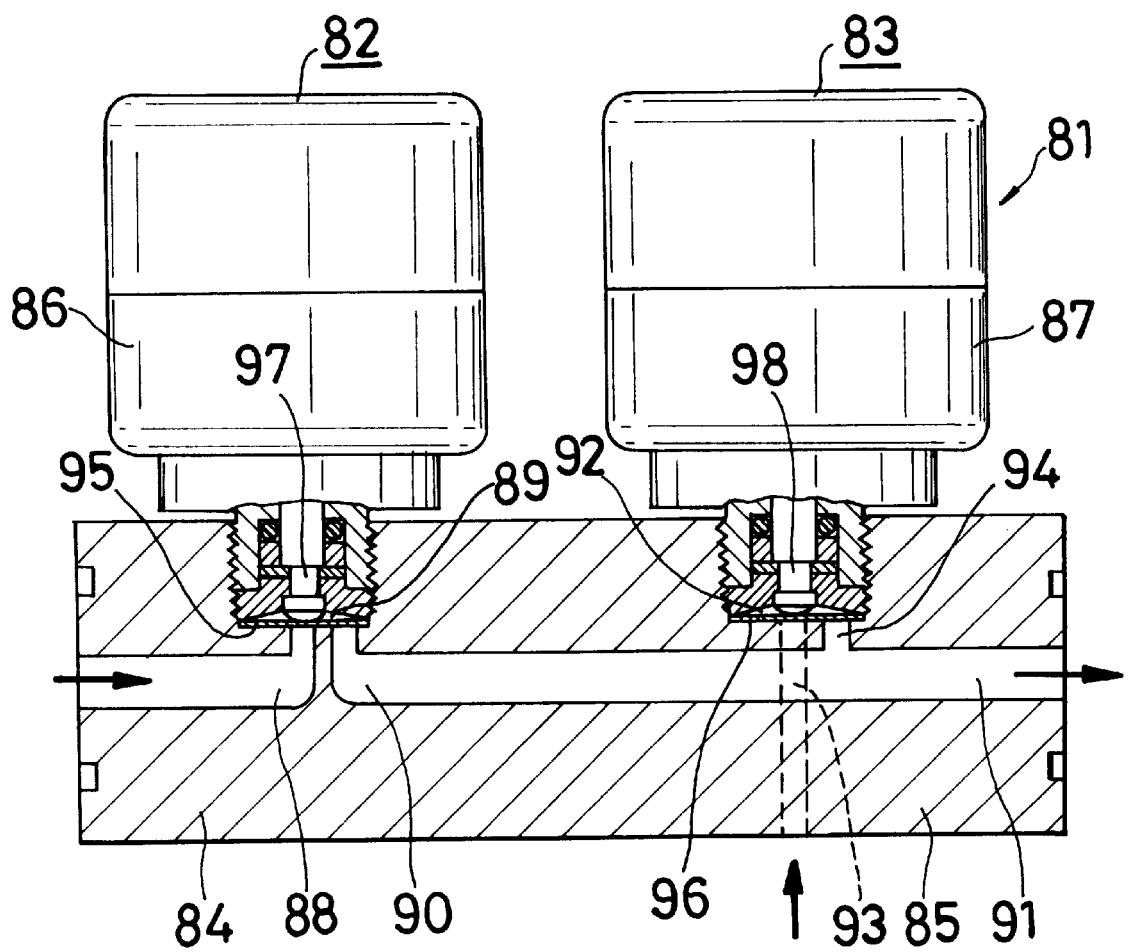
FIG. 4 is a view in vertical section of a Prior Art shutoff-opening device.

FIGS. 1 to 3 show shutoff-opening devices 1, 2 embodying the invention. These devices 1, 2 are installed at the inlet side (rear side) and the outlet side (front side) of a massflow controller 3 or like fluid controller to provide a fluid control apparatus 4, for example, for use in semiconductor manufacturing equipment.

The shutoff-opening device 1 at the inlet side comprises a first check valve 5, first on-off valve 6 and second on-off valve 7 which are arranged in this order in a direction from the rear toward the massflow controller 3. The shutoff-opening device 2 comprises a third on-off valve 8, fourth on-off valve 9, fifth on-off valve 10 and second check valve 11 which are arranged in this order forward at the front side of the controller 3.

Each on-off valves 6 (7, 8, 9, 10) comprises a rectangular parallelepipedal valve main body 37 (39, 41, 43, 45) and an actuator 36 (38 40, 42, 44) attached to the valve main body from above for suitably closing or opening a fluid channel inside the main body. Each check valve 5 (11) comprises an upstream (rear) valve main body 33 (46), a central valve main body 34 (47) connected to the main body 33 (46) with screws, a downstream (front) valve main body 35 (48) connected to the main body 34 (47) with screws and a check mechanism 49 to be described below.

The fluid control apparatus 4 comprises a purge gas introduction line 28 connected to the first check valve 5, a process gas introduction line 29 connected to the second on-off valve 7, an evacuating line 30 connected to the third on-off valve 8, a process gas feed line 31 connected to the fourth on-off valve 9, and a purge gas discharge line 32 connected to the second check valve 11.

Disposed beneath the upstream valve main body 33 of the first check valve 5 is a channel block 12 having thereunder a joint 13 for connection to the purge gas introduction line 28. Disposed beneath the downstream valve main body 35 of the first check valve 5 is a channel block 14 for connection to the valve main body 37 of the first on-off valve 6.

Positioned beneath the valve main body 39 of the second on-off valve 7 is a channel block 15 having thereunder a joint 16 for connection to the process gas introduction line 29. A channel block 17 for connection to the massflow controller 3 is provided on the front side of the valve main body 39 of the second on-off valve 7.

Disposed on the rear side of the massflow controller 3 is an inlet channel block 18 which is connected to the channel block 17 in front of the valve main body 39 of the second on-off valve 7 with screws driven in from above. An outlet channel block 19 symmetric with the inlet channel block 18 is provided on the front side of the massflow controller 3.

Disposed on the rear side of the valve main body 41 of the third on-off valve 8 is a channel block 20 for connection to the outlet channel block 19 on the front side of the massflow controller 3. A channel block 21 having thereunder a joint 22 for connection to the evacuating line 30 in communication with a vacuum pump is provided beneath the valve main body 41 of the third on-off valve 8.

Provided beneath the valve main body 43 of the fourth on-off valve 9 is a channel block 23 having thereunder a joint 24 for connection to the process gas feed line 31 in communication with a process chamber.

A channel block 25 for connection to the upstream valve main body 46 of the second check valve 11 is disposed on the front side of the valve main body 45 of the fifth on-off valve 10.

Disposed beneath the downstream valve main body 48 of the second check valve 11 is a channel block 26 having on the front side thereof a joint 27 for connection to the purge gas discharge line 32.

In the first and second check valves 5, 11, the upstream valve main bodies 33, 46 are fastened to the respective channel blocks 12, 25 therebeneath with screws driven in from above the bodies 33, 46, and the downstream valve main bodies 35, 48 are fastened to the respective channel blocks 14, 26 therebeneath with screws driven in from above the bodies 35, 48. Accordingly, the check valves 5, 11 can be removed upward by removing these screws,.

FIG. 3 is a sectional view showing the shutoff-opening device 1 at the inlet side. With reference to this drawing, the interior construction of the first check valve 5, first on-off valve 6 and second on-off valve 7 will be described.

The check mechanism 49 of the first check valve 5 comprises a tubular stationary seal member 51 disposed in a rightward recess 34a formed in the central valve main body 34, a tubular movable seal member 52 disposed downstream from the stationary seal member 51 and opposed thereto, and a diaphragm 53 held between the central valve main body 34 and the downstream valve main body 35 for moving the movable seal member 52 forward and rearward. The upstream valve main body 33 of the first check valve 5 has an inverted L-shaped inflow channel 54 having one end opened downward and the other end opened forward. The downstream valve main body 35 of the valve 5 has an inverted L-shaped outflow channel 56 having one end opened downward and the other end opened rearward. The peripheral wall of the stationary seal member 51 is formed with a communication channel 55 for holding the inflow channel 54 in communication with the interior of the recess 34a therethrough. The seal member 51 has a front end closed with an end wall. Accordingly, when the rear end of the movable seal member 52 is away from the end wall of the stationary seal member 52, it is possible for a fluid to flow through the clearance between the rear end of the movable seal member 52 and the end wall of the stationary seal member 51 from inside the recess 34a into the movable seal member 52 or from inside the seal member 52 into the recess 34a. Conversely if the rear end of the movable seal member 52 is brought into contact with the end wall of the stationary seal member 51, the flow of fluid from inside the recess 34a into the movable seal member 52 or from inside the seal member 52 into the recess 34a is blocked.

When a fluid (purge gas in the present embodiment) flows into the inflow channel 54 of the first check valve 5, the pressure of the fluid deforms the diaphragm 53 forward, consequently moving the movable seal member 52 out of contact with the stationary seal member 51. The fluid flows by virtue of its own pressure from inside the recess 34a into the outflow channel 56 through the interior of the movable seal member 52. On the other hand, when the fluid is about to flow reversely from the outflow channel 56 into the recess 34a with the introduction of fluid into the inflow channel 54 discontinued, the diaphragm 53 is deformed rearward, consequently bringing the movable seal member 52 into contact with the stationary seal member 51 and blocking the reverse flow of the fluid from the outflow channel 56 into the recess 34a. Although not shown, the second check valve 11 has the same construction as the first check valve 5.

The connection channel block 14 provided beneath the downstream valve main body 41 of the first check valve 5 is formed with an L-shaped communication channel 57 communicating with the outflow channel 56 of the first check valve 5.

The valve main body 37 of the first on-off valve 6 has an L-shaped inflow channel 58 communicating with the communication channel 57, and an L-shaped outflow channel 60 communicating with the inflow channel 58 through a valve chamber 59. The communication between the channels 60 and 58 is shut off or established by the operation of the valve actuator 36. The first on-off valve 6 has a diaphragm (valve element) 65 to serve as a diaphragm valve which is normally open. When a valve stem 66 for pressing the diaphragm 65 is lowered, the inflow channel 58 is blocked. Although not shown, the fifth on-off valve 10 is of the same type as the first on-off valve 6, and corresponds to the valve 6 as used with its front-rear relation, i.e., the inflow channel and the outflow channel, reversed.

The valve main body 39 of the second on-off valve 7 is formed with a first fluid inflow channel 61 having one end communicating with the L-shaped outflow channel 60 of the first on-off valve 5 and the other end communicating with a valve chamber 62, a second fluid inflow channel 63 having one end communicating with an inflow channel (not shown) of the channel block 15 under the valve main body 39 and the other end communicating with the valve chamber 62, and an outflow channel 64 adapted for use with first and second fluids in common and having one end communicating with the chamber 62 and the other end communicating with an inflow channel of the channel block 17 for connection to the massflow controller 3. The first fluid inflow channel 61 is always in communication with the common outflow channel 64 through the valve chamber 62. The second fluid inflow channel 63 communicates with the inflow channel 61 and the outflow channel 64 via the valve chamber 63, the communication being shut off or established by a diaphragm (valve element) 67. The second on-off valve 7 is a diaphragm valve which is normally closed. A valve stem 68 for pressing the diaphragm 67 is raised within the valve chamber 62 by the operation of the valve actuator 38, whereby the second fluid inflow channel 63 is opened. Even while the channel 63 is blocked, the first fluid inflow channel 61 is held in communication with the common outflow channel 64 through an annular groove 62a formed in the bottom wall of the valve chamber 62.

With the fluid control apparatus described, a process gas is introduced into the second on-off valve 7 through the process gas introduction line 29, with the first on-off valve 6 closed, the second on-off valve 7 opened, the third on-off valve 8 closed, the fourth on-off valve 9 opened and the fifth on-off valve 10 closed. The process gas, having its flow rate controlled by the massflow controller 3, is fed to the process chamber via the third on-off valve 8, fourth on-off valve 9 and process gas feed line 31. A purge gas is thereafter introduced into the first check valve 5 through the purge gas introduction line 28, with the first on-off valve 6 opened, the second on-off valve 7 closed, the third on-off valve 8 closed, the fourth on-off valve 9 closed and the fifth on-off valve 10 opened, whereupon the purge gas flows through the first check valve 5, first on-off valve 6, second on-off valve 7, massflow controller 3, third on-off valve 8, fourth on-off valve 9, fifth on-off valve 10, second check valve 11 and purge gas discharge line 32, whereby the fluid control apparatus is purged of the process gas. Subsequently, the apparatus is evacuated through the evacuating line 30, with the third on-off valve 8 opened, whereby the purge gas remaining inside the apparatus is drawn off to clean the interior of the apparatus.

With reference to FIG. 3, the flows of gases through the shutoff-opening device 1 at the inlet side will be described.

For the passage of the second fluid (process gas in the present embodiment), the second on-off valve 7 is operated by the valve actuator 38, that is, the second fluid inflow channel 63 is caused to communicate with the first fluid inflow channel 61 and with the common outflow channel 64, permitting the second fluid to flow from the inflow channel 63 into the outflow channel 64. When the first fluid (purge gas in the present embodiment) is to be subsequently passed, the second on-off valve 7 is operated through the valve actuator 38 to shut off the second fluid inflow channel 63. The first fluid flows through the first check valve 5, connection channel block 14 and first on-off valve 6 into the first fluid inflow channel 61 of the second on-off valve 7 and then into the massflow controller 3, forcing out the second fluid remaining in the common outflow channel 64 of the valve 7 by virtue of its own pressure. This quickly eliminates the state wherein the second fluid is mixed with the first fluid, permitting the flow of the first fluid (purge gas) only in a short period of time.

Although not shown in detail, the third on-off valve 8 and the fourth on-off valve 9 are of the same type as the second on-off valve 7. The fourth on-off valve 9 corresponds to the second on-off valve 7 as used with its front-rear relation reversed, i.e., with the inflow channel and the outflow channel reversed. The third on-off valve 8 corresponds to the second on-off valve 7 as used with its front-rear relation reversed and further with the outflow channel serving as an evacuating channel.

The butting end faces of the valve main bodies 37, 39, 41, 43, 45, and the butting end faces of the valve main bodies 33, 35, 39, 41, 43, 45, 46, 48 and the channel blocks 12, 14, 15, 17, 18, 19, 20, 21, 23, 25, 26 have respective seal portions 69 which are all of the same construction. The construction of the seal portion 69 will be described with reference to the butting end faces of the channel block 14 beneath the downstream valve main body 35 of the first check valve 5 and the valve main body 37 of the first on-off valve 6.

The butting end face of the channel block 14 and that of the valve main body 37 are formed symmetrically and have respective retainer holding hollow cylindrical portions 72, 73. An annular gasket 70 is interposed between these end faces, and a retainer 71 holds the outer periphery of the gasket 70 to cause the valve main body 37 to retain the gasket 70. The retainer 71 can be held by either one of the block 14 and valve main body 37. Accordingly, the various channel blocks 12, 14, 15, 17, 18, 19, 20, 21, 23, 25, 26 can be successively joined to the different valve main bodies 33, 35, 37, 39, 41, 43, 45, 46, 48 without the necessity of checking each of the butting end faces as to whether it is of the male type or female type.

The valve main body 37 of the first on-off valve 6 and the valve main body 39 of the second on-off valve 7 can be in the form of an integral member without interposing any seal portion therebetween. Similarly, the valve main body 41 of the third on-off valve 8, the valve main body 43 of the fourth on-off valve 9 and the valve main body 45 of the fifth, on-off valve 10 may be in the form of an integral member.

With the fluid control apparatus described, the purge gas line and the process gas line may be replaced by each other in a reverse relation. The flow of the process gas can then be replaced by the purge gas more rapidly. The shutoff-opening device 1 at the inlet side comprises two on-off valves 6, 7, and the shutoff-opening device 2 at the outlet side has three on-off valves 8, 9, 10, whereas the number of component on-off valves is variable suitably. Shutoff-opening devices each comprising a suitable number of on-off valves are arranged respectively at the inlet side and outlet side of a massflow controller, and such arrangements are further arranged in parallel to provide a fluid control apparatus for use in semiconductor manufacturing equipment.

What is claimed is:

1. A shutoff-opening device, comprising:

a plurality of valves installed at a fluid inlet and/or a fluid outlet of a fluid controller for closing or opening a plurality of fluid channels, wherein a valve main body of at least one of the valves has a first inflow channel, a first outflow channel, the first inflow channel always being in communication with the first outflow channel through a valve chamber, a valve element being operable to bring the second inflow or outflow channel into or out of communication with the first inflow channel and the first outflow channel through the valve chamber.

2. The shutoff-opening device according to claim 1, which is installed at a fluid inlet side of a fluid controller in a semiconductor manufacturing apparatus and wherein the second inflow or outflow channel serves as an inflow channel for a process gas, and the first inflow channel serves as an inflow channel for a purge gas, the first outflow channel being serviceable as an outflow channel for the two gases in common.

3. The shutoff-opening device according to claim 1, which is installed at a fluid outlet side of a fluid controller in a semiconductor manufacturing apparatus and wherein the second inflow or outflow channel serves as an outflow channel for a process gas, and the first outflow channel serves as an outflow channel for a purge gas, the first inflow channel being serviceable as an inflow channel for the two gases in common.

4. The shutoff-opening device according to claim 1, further comprising:

a check valve having an upstream valve main body, a central valve main body, a downstream valve main body and a check mechanism.

5. The shutoff-opening device according to claim 4, wherein the check mechanism of the check valve comprises a tubular stationary seal member disposed in a rightward recess formed in the central valve main body, a tubular movable seal member disposed downstream from the stationary seal member disposed downstream from the stationary seal member and opposed thereto, and a diaphragm held between the central valve main body and the downstream valve main body for moving the movable seal member forward and rearward.

6. The shutoff-opening device according to claim 1, wherein said fluid controller comprises a massflow controller.

* * * * *